US012189565B2

(12) United States Patent
Tolchinsky et al.

(10) Patent No.: US 12,189,565 B2
(45) Date of Patent: Jan. 7, 2025

(54) TRANSACTION GENERATOR FOR ON-CHIP INTERCONNECT FABRIC

(71) Applicant: Apple Inc., Cupertino, CA (US)

(72) Inventors: Igor Tolchinsky, Haifa (IL); Charles J. Fleckenstein, Portland, OR (US); Sagi Lahav, Haifa (IL); Lital Levy-Rubin, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/306,087

(22) Filed: Apr. 24, 2023

(65) Prior Publication Data

US 2023/0334003 A1 Oct. 19, 2023

Related U.S. Application Data

(63) Continuation of application No. 17/320,169, filed on May 13, 2021, now Pat. No. 11,669,480.

(51) Int. Cl.
*G06F 13/40* (2006.01)
*G06F 13/42* (2006.01)

(52) U.S. Cl.
CPC ...... *G06F 13/4068* (2013.01); *G06F 13/4027* (2013.01); *G06F 13/4282* (2013.01); *G06F 2213/0038* (2013.01); *G06F 2213/0042* (2013.01)

(58) Field of Classification Search
CPC .................................................. G06F 3/067
See application file for complete search history.

(56) References Cited

U.S. PATENT DOCUMENTS

| | | | |
|---|---|---|---|
| 6,055,590 A | 4/2000 | Pettey et al. | |
| 6,145,044 A | 11/2000 | Ogura | |
| 6,701,398 B1 | 3/2004 | Wyland | |
| 7,167,939 B2 | 1/2007 | Nguyen et al. | |
| 9,432,278 B2 | 8/2016 | Kaler et al. | |
| 2021/0133911 A1 | 5/2021 | Yao et al. | |

*Primary Examiner* — Henry Tsai
*Assistant Examiner* — Juanito C Borromeo
(74) *Attorney, Agent, or Firm* — Kowert, Hood, Munyon, Rankin & Goetzel, P.C.; Scott W. Pape; Dean M. Munyon

(57) ABSTRACT

In an embodiment, an SOC includes a global communication fabric that includes multiple independent networks having different communication and coherency protocols, and a plurality of input-output (I/O) clusters that includes different sets of local functional circuits. A given I/O cluster may be coupled to one or more of the independent networks and may include a particular set of local functional circuits, a local fabric coupled to the particular set of local functional circuits, and an interface circuit coupled to the local fabric and configured to bridge transactions between the particular set of local functional circuits and the global communication fabric. The interface circuit may include a programmable hardware transaction generator circuit configured to generate a set of test transactions that simulate interactions between the particular set of local functional circuits and a particular one of the one or more independent networks.

20 Claims, 10 Drawing Sheets

Network 400 independent network packet format 680 | header (12 bits) | address (8 bytes) | payload (4-256 bytes) | local fabric packet format 685 | header (8 bits) | address (4 bytes) | payload (1-32 bytes) |

FIG. 6

| Virtual Channel | Networks |
|---|---|
| Bulk | CPU, I/O, Relaxed |
| LLT | CPU, I/O, Relaxed |
| RT | I/O |
| VCP | I/O |

780

| Type | Networks |
|---|---|
| Coherent | CPU, I/O |
| Non-coherent | Relaxed |
| RT | I/O |
| VCP | I/O |

```
┌─────────────────────────────────────────────────────────────────────┐
│ Bridging, by an interface circuit included in an integrated circuit,│
│ transactions between a plurality of local functional circuits       │
│ coupled to a local fabric circuit and a global communication fabric │
│ that includes multiple independent networks having different        │
│ communication and coherency protocols.                              │
│                                 910                                 │
└─────────────────────────────────────────────────────────────────────┘
                                  │
                                  ▼
┌─────────────────────────────────────────────────────────────────────┐
│ Generating, by the interface circuit, a test transaction that       │
│ simulates a transaction from a particular one of the plurality of   │
│ local functional circuits to a particular one of the multiple       │
│ independent networks.                                               │
│                                 920                                 │
└─────────────────────────────────────────────────────────────────────┘
                                  │
                                  ▼
┌─────────────────────────────────────────────────────────────────────┐
│ Processing, by the interface circuit, the test transaction in a     │
│ same manner as a non-test transaction from the particular local     │
│ functional circuit.                                                 │
│                                 930                                 │
└─────────────────────────────────────────────────────────────────────┘
```

```
┌─────────────────────────────────────────────────┐
│ Generating, by the interface circuit, a first   │
│ test transaction of a first type of transaction │
│ of a plurality of types supported by the        │
│ interface circuit, wherein ones of the          │
│ plurality of types have different priorities.   │
│                    1010                         │
└─────────────────────────────────────────────────┘
                       ↓
┌─────────────────────────────────────────────────┐
│ Selecting, by the interface circuit, a first    │
│ one of a plurality of virtual channels          │
│ supported by the interface circuit based on     │
│ the first type.                                 │
│                    1020                         │
└─────────────────────────────────────────────────┘
                       ↓
┌─────────────────────────────────────────────────┐
│ Placing, by the interface circuit, a memory     │
│ request associated with the first test          │
│ transaction in a queue for the first selected   │
│ virtual channel.                                │
│                    1030                         │
└─────────────────────────────────────────────────┘
                       ↓
┌─────────────────────────────────────────────────┐
│ Generating, by the interface circuit while the  │
│ first test transaction is being processed, a    │
│ second test transaction of a second type with   │
│ a different priority.                           │
│                    1040                         │
└─────────────────────────────────────────────────┘
                       ↓
┌─────────────────────────────────────────────────┐
│ Selecting, by the interface circuit, a second   │
│ one of the plurality of virtual channels based  │
│ on the second type.                             │
│                    1050                         │
└─────────────────────────────────────────────────┘
                       ↓
┌─────────────────────────────────────────────────┐
│ Placing, by the interface circuit, a memory     │
│ request associated with the second test         │
│ transaction in a queue for the second selected  │
│ virtual channel.                                │
│                    1060                         │
└─────────────────────────────────────────────────┘
```

*FIG. 10*

TRANSACTION GENERATOR FOR ON-CHIP INTERCONNECT FABRIC

CROSS-REFERENCE TO RELATED APPLICATIONS

The present application is a continuation of U.S. application Ser. No. 17/320,169, entitled "Transaction Generator for On-chip Interconnect Fabric," filed May 13, 2021, the disclosure of which is incorporated by reference herein in its entirety.

BACKGROUND

Technical Field

Embodiments described herein are related to system on a chip (SOC) integrated circuits and, more particularly, to circuits for testing interconnects between components in an SOC.

Description of the Related Art

System on a chip (SOC) integrated circuits (ICs) generally include one or more processors that serve as central processing units (CPUs) for a system, along with various other components such a memory controllers and peripheral components. Additional components can be included with the SOC to form a given device. However, as the number of transistors that can be achieved on in integrated circuit die has continued to increase, it has been possible to incorporate increased numbers of processors and other components on a given SOC and thus reduce the number of other components needed to form the given device.

Increasing the numbers of processors and other discrete components on an SOC is desirable for increased performance. Additionally, cost savings can be achieved in a device by reducing the number of other components needed to form the device in addition to the SOC. On the other hand, increasing the numbers of processors and other components on the SOC increases the bandwidth requirements between the memory controllers and the components, thereby resulting in use of complex interconnects to communicate between the various components of the SOC. Such complexity may present difficulty for evaluating performance of circuits that reside within the complex interconnects.

SUMMARY

In an embodiment, a system on a chip (SOC) includes a global communication fabric that includes multiple independent networks having different communication and coherency protocols, and a plurality of input-output (I/O) clusters that includes different sets of local functional circuits. A given I/O cluster may be coupled to one or more of the independent networks of the global communication fabric and may include a particular set of local functional circuits, a local fabric coupled to the particular set of local functional circuits, and an interface circuit coupled to the local fabric. The interface circuit may be configured to bridge transactions between the particular set of local functional circuits and the global communication fabric. The interface circuit may include a programmable hardware transaction generator circuit that is configured to generate a set of test transactions that simulate interactions between the particular set of local functional circuits and a particular one of the one or more independent networks.

In a further embodiment, to simulate the interactions, the interface circuit may be further configured to receive, at an input from the local fabric, the set of test transactions in a first format supported by the local fabric. The interface circuit may also be configured to translate the set of test transactions from the first format to a second format supported by the particular independent network.

In another example, to generate the set of test transactions, the programmable hardware transaction generator circuit may be configured to include, in one or more test transactions of the set of test transactions, a first maximum amount of data allowed by the particular independent network. In an embodiment, the first maximum amount of data allowed by the particular independent network may be greater than a second maximum amount of data allowed by the local fabric.

In a further example, individual ones of the particular set of local functional circuits may perform different functions. The programmable hardware transaction generator circuit may be further configured to generate a first test transaction of the set of test transactions that is compatible with a first function performed by a first local functional circuit of the particular set, and to generate a second test transaction that is compatible with a second function performed by a second local functional circuit of the particular set.

In an embodiment, the local fabric may be non-coherent while at least one of the multiple independent networks may be configured to enforce coherency. In another example, a first network of the multiple independent networks may have a ring topology, while a second network of the multiple independent networks may have a mesh topology.

BRIEF DESCRIPTION OF THE DRAWINGS

The following detailed description refers to the accompanying drawings, which are now briefly described.

FIG. 6 depicts embodiments of packet formats for an independent network and for a local fabric.

FIG. 7 illustrates a pair of tables illustrating embodiments of virtual channels and traffic types associated with various independent networks.

FIG. 9 shows a flow diagram for an embodiment of a method for generating test transactions by an interface circuit.

FIG. 10 depicts a flow diagram for an embodiment of a method for selecting a network and virtual channel based on a type of test transaction that is generated.

Figure 1:
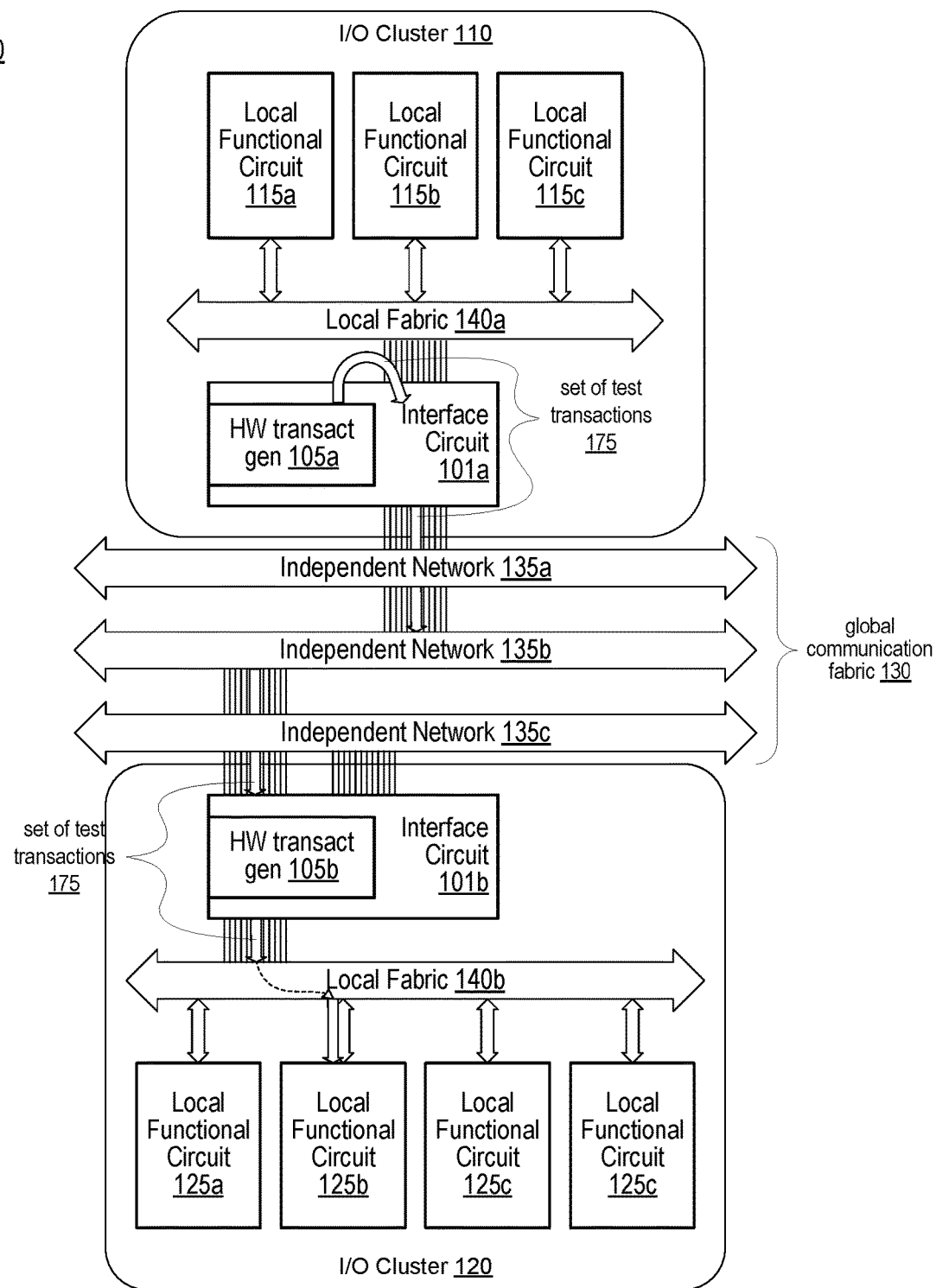
FIG. 1 illustrates a block diagram of an embodiment of a system on chip that includes multiple independent networks as well as local fabrics.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

A system-on-a-chip (SOC) may include a global communication fabric that includes a plurality of independent networks. The networks may be physically independent (e.g., having dedicated wires and other circuitry that form the network) and logically independent (e.g., communications sourced by agents in the SOC may be logically defined to be transmitted on a selected network of the plurality of networks and may not be impacted by transmission on other networks). In some embodiments, network switches may be included to transmit packets on a given network. As used herein, an "agent" refers to a functional circuit that is capable of initiating (sourcing) or being a destination for communications on a network. An agent may generally be any circuit (e.g., processor, peripheral, memory controller, etc.) that may source and/or sink communications on a network. A source agent generates (sources) a communication, and a destination agent receives (sinks) the communication. A given agent may be a source agent for some communications and a destination agent for other communications. In some cases, communication between two agents (also referred to as a "transaction") may cross between two or more of the networks.

By providing physically and logically independent networks, high bandwidth may be achieved via parallel communication on the different networks. Additionally, different traffic may be transmitted on different networks, and thus a given network may be optimized for a given type of traffic. For example, processors such as central processing units (CPUs) in an SOC may be sensitive to memory latency and may cache data that is expected to be coherent among the processors and memory. Accordingly, a CPU network may be provided on which the CPUs and the memory controllers in a system are agents. Such a CPU network may support cache coherency as well as low-latency transactions to support an increased bandwidth for CPU operations. Another network may be an input/output (I/O) network. This I/O network may be used by various peripheral devices ("peripherals") to communicate with memory. The network may support the bandwidth needed by the peripherals and may also support cache coherency. Furthermore, the SOC may additionally include a relaxed order network. The relaxed order network may be non-coherent and may not enforce as many ordering constraints as an I/O or a CPU network. The relaxed order network may be used by graphics processing units (GPUs) to communicate with memory controllers. Other embodiments may employ any subset of the above networks and/or any additional networks, as desired.

In addition to the multiple independent networks of the global communication fabric, some SOCs may include one or more local fabric circuits that are used to couple a group of peripheral circuits that are physically located near one another on the chip. Transactions within the group of peripheral circuits are completed vis the local fabric. While the networks of the global communication fabric may physically reach across a broad area of the chip, the local fabric circuit may be limited to an area of the chip in which the group of peripheral circuits is located. To support communication to/from the group of peripheral circuits from/to agents coupled to the global communication fabric, an interface circuit may be included to bridge transactions between the local fabric circuit and the global communication fabric.

Such interface circuits provide a bridge between the group of peripheral circuits and the global communication fabric. In some embodiments, the interface circuits may be the only bridge between a particular group of peripheral circuits and the global communication fabric. Accordingly, adequate evaluation and testing of these interface circuits may be critical to achieving desired operations of the SOC. The positioning of the interface circuits at a nexus of a plurality of communication networks, however, may result in difficulty generating adequate test stimulus for completing an adequate evaluation. An evaluator of the SOC may have little to no access to the group of peripheral circuits, and/or the group of peripheral circuits may have limited capabilities for generating adequate test stimulus.

Accordingly, apparatus and methods are disclosed, in which an interface circuit is coupled to a local fabric and configured to bridge transactions between a particular set of local functional circuits and a global communication fabric. To support testing, the interface circuit includes a programmable hardware transaction generator circuit configured to generate a set of test transactions that simulate interactions between the particular set of local functional circuits and a particular one of the one or more independent networks. Use of such a hardware transaction generator circuit may enable adequate test stimulus to be generated for an interface circuit that is otherwise inaccessible by an evaluator. This hardware transaction generator may allow the evaluator to, via a debugging circuit, generate test transactions without access to test and/or end-user software, as well allowing the evaluator to replicate transactions that occur during unexpected behavior of a given functional circuit. This testing may produce test results that allow the evaluator to determine if the interface circuit is functioning as expected, if a design of the interface should be revised, or if a particular SOC being tested is defective. Having this capability can remove a dependency on software configuration of input/output devices to generate the transactions required to validated the fabric and interaction with other blocks in the SOC.

It is noted that, as used herein, "test" and "testing" refers to generation and application of test stimulus to circuits-under-test and capturing resulting behavior of the tested circuits that may be compared to expected behavior. "Testing" as used herein includes any suitable type of testing, including, for example, evaluation and characterization of new circuits and or manufacturing processes, functional testing as part of a manufacturing flow, and debugging of circuits and/or program code that is exhibiting abnormal or otherwise unexpected behavior.

Turning now to the figures, FIG. 1 illustrates an embodiment of an SOC that includes a pair of interface circuits 101a and 101b (collectively referred to as interface circuits 101) each coupling a respective local fabric 140a and 140b (collectively 140) to one or more independent networks 135a-135c of global communication fabric 130. Each local fabric 140 is coupled to a respective set of local functional circuits 115a-115c (115 collectively) and local functional circuits 125a-125d (125 collectively). Each of interface circuits 101 include a respective one of hardware transaction generators (HW transact gen) 105a and 105b (105 collectively). Interface circuit 101a, local fabric 140a, and the set of local functional circuits 115 are included in input/output (I/O) cluster 110. In a similar manner, interface circuit 101b, local fabric 140b, and the set of local functional circuits 125 are included in input/output (I/O) cluster 120.

As shown, global communication fabric 130 includes multiple independent networks 135a-135c, wherein ones of independent networks 135a-135c have different communication and coherency protocols. For example, independent network 135a may be a CPU network that supports cache coherency as well as low-latency transactions between a plurality of CPU cores and one or more memory controllers to access, e.g., volatile and non-volatile memories. Independent network 135b may, in some embodiments, be a relaxed-order network that does not enforce cache coherency and may support lowest quality-of-service (QoS) bulk transactions as well higher QoS low-latency transactions. Agents coupled to independent network 135b may include functional circuits that include their own memory resources, and are, therefore, not dependent on memory resources accessed via global communication fabric 130. Independent network 135c may, for example, be an input/output (I/O) network that also supports cache coherency and low-latency transactions between memories and some peripheral circuits. Such an I/O network may further support additional protocols such as real-time transactions that have a higher QoS than low-latency transactions. For example, peripheral circuits used in a smartphone may include I/O circuits for communicating with a cellular radio and utilizing real-time priorities to manage an active phone call.

I/O clusters 110 and 120, as illustrated, include different sets of local functional circuits 115 and 125, respectively. I/O cluster 110 is coupled to independent network 135b of global communication fabric 130, while I/O cluster 120 is coupled to independent networks 135b and 135c. I/O cluster 110 may include, for example, a set of serial interfaces, such as universal serial bus (USB) circuits for communicating with USB peripherals. I/O cluster 120, on the other hand, may include a set of display circuits for communicating with one or more display devices.

Local fabric 140a supports communication between respective ones of local functional circuits 115 and, similarly, local fabric 140b supports communication between respective ones of local functional circuits 125. Each of local fabrics 140 includes at least one communication bus for exchanging transactions locally among the respective groups of local functional circuits 115 and 125. In various embodiments, either of local fabrics 140 may include additional buses, arranged in any suitable topology (e.g., mesh, ring, tree, etc.), that are coupled together via one or more bus multiplexing circuits.

Interface circuit 101b, coupled to local fabric 140b, is configured to bridge transactions between local functional circuits 125 and global communication fabric 130. For example, data for new image frames and/or overlays for a currently displayed image may be sent from a CPU or a GPU included elsewhere in SOC 100 to one or more of local functional circuits 125 to be shown on one of the display devices. In a similar manner, interface circuit 101a, coupled to local fabric 140a, is configured to bridge transactions between local functional circuits 115 and global communication fabric 130.

Interface circuits 101a and 101b, as shown, are arranged such that they operate between I/O clusters 110 and 120, respectively, and global communication fabric 130. To perform desired functional tests of interface circuits 101, an evaluator may send large amounts of data through each interface circuit 101 to determine how much data each one can manage before reaching a throughput limit, as well as determining how each interface circuit 101 reacts when amounts of data in test transactions reach and/or exceed this limit. In addition, an evaluator may wish to determine how interface circuits 101 behave when test transactions are sent that include incorrect protocols, mismatched coherency requirements, and/or other invalid transaction characteristics. Generating invalid or otherwise challenging test transactions may require direct access to an input of interface circuits 101, because local functional circuits 115 and 125 may not have capabilities to generate such test cases. Due to their arrangement, however, access to these inputs of interface circuits 101 may not be easy to accomplish or may not be possible at all without using destructive measures to gain such access.

To enable testing of interface circuits 101, interface circuit 101a includes programmable hardware transaction generator circuit 105a and interface circuit 101b includes programmable hardware transaction generator circuit 105b. In other embodiments, respective hardware transaction generator circuits 105 may be included external to interface circuits 101, but closely coupled to interface circuits 101 to allow desired test transactions to be generated and sent as described herein. Referring to interface circuit 101a as exemplary, hardware transaction generator circuit 105a is configured to generate set of test transactions 175 that simulate interactions between one or more of the particular set of local functional circuits 115 and independent network 135b. To simulate the interactions, interface circuit 101a is further configured to receive, at an input from local fabric 140a, set of test transactions 175 in a first format supported by local fabric 140a, and to translate set of test transactions 175 from the first format to a second format supported by independent network 135b.

For example, hardware transaction generator circuit 105a may be programmed by an evaluator to generate set of test transactions 175 such that set of test transactions 175 appear to come from local functional circuit 115a and have a destination of local functional circuit 125b in I/O cluster 120. Since local functional circuit 125b is in a different I/O cluster than interface circuit 101a, set of test transactions 175 are sent via global communication fabric 130. Transactions sent via local fabric 140a may have a different format than transactions sent via independent network 135b, such as different headers and or address formats. Hardware transaction generator circuit 105a generates set of test transactions 175 using the format for local fabric 140a and interface circuit 101a receives set of test transactions 175 at an input used to receive transactions from local fabric 140a (e.g., a local fabric input port). Interface circuit 101a may translate each transaction of set of test transactions 175 into the format used by independent network 135b and then sends each translated transaction to an output coupled to independent network 135b (e.g., a network output port).

Depending on characteristics of a given test transaction in set of test transactions 175, the given test transaction may be successfully sent by interface circuit 101a, routed by independent network 135b, received by interface circuit 101b, and directed to local functional circuit 125b, thereby causing local functional circuit 125b to react in a particular expected manner. A different test transaction may be generated with an expectation of interface circuit 101a or another element in the path to local functional circuit 125b failing to properly receive or send the different test transaction. A particular behavior by the failing element is expected and any variation from the expected response may be noted and used to determine a design change for SOC 100 or to identify a manufacturing defect in a particular instance of SOC 100 being tested.

As illustrated, to generate set of test transactions 175, hardware transaction generator circuit 105*a* is configured to include, in one or more test transactions of set of test transactions 175, a first maximum amount of data allowed by independent network 135*b*. This first maximum amount of data allowed by independent network 135*b* may be greater than a second maximum amount of data allowed by local fabric 140*a*. Local fabric 140*a*, for example, may be limited to fewer bytes of data per transaction, and/or per packet of data that is sent for a given transaction, as compared to independent network 135*b*. By configuring hardware transaction generator circuit 105*a* to generate more packets and/or more data per packet than local fabric 140*a* is configured to support, limits of the capabilities of interface circuit 101*a* may be determined, thereby determining, for example, that a new or revised design of interface circuit 101*a* is capable of meeting or exceeding performance expectations or that interface circuit 101*a* may be a limiting factor for exchanging data to and from local functional circuits 115.

As an example, local fabric 140*a* may limit a single transaction to 64 packets, with each packet including a 16-byte payload. In contrast, independent network 135*b* may not include a limit on a number of packets per transaction or may have a significantly higher limit such as 1024 packets per transaction. In addition, independent network 135*b* may support 64 bytes per packet. In other embodiments, capacities for local fabric 140*a* and independent network 135*b* may be the opposite. Local fabric 140*a* may support a larger number of packets per transaction and/or a greater number of bytes per packet.

As illustrated, individual ones of local functional circuits 115 may perform different functions. For example, local functional circuit 115*a* may be a USB interface coupled to a USB port on a device that includes SOC 100, local functional circuit 115*b* may be a Firewire® interface coupled to a Firewire port on the device, and local functional circuit 115*c* may be a Bluetooth interface to a Bluetooth radio included in the device. To further simulate interactions between one or more of local functional circuits 115 and independent network 135*b*, hardware transaction generator circuit 105*a* is further configured to generate a first test transaction of set of test transactions 175 that is compatible with a first function performed by local functional circuit 115*a* (e.g., mimic a transaction including a plurality of USB packets), and to generate a second test transaction that is compatible with a second function performed by local functional circuit 115*c* (e.g., a transaction including a set of Bluetooth packets).

To enable the capability of mimicking different functions, hardware transaction generator circuits 105 are programmable, allowing various types, values, and amounts of data to be generated. Data may be generated in various sizes of words, signed or unsigned, with any suitable values and with any suitable volume of data. In some embodiments, hardware transaction generator circuits 105 may be configured to generate a given test transaction by reading data associated with the transaction from a memory included in SOC 100. In other embodiments, hardware transaction generator circuits 105 may include a plurality of registers that allow an evaluator to configure a particular data pattern to be used as a payload for a given test transaction. Any suitable technique may be used to cause hardware transaction generator circuits 105 to initiate a given test transaction, such as by determining that a particular test mode has been entered, or based on receiving a particular command to start a test. In some embodiments, hardware transaction generator circuits 105 may be configured to wait for a particular number of clock cycles of a system clock signal, or wait for a particular time of day as indicated by a time keeping circuit in SOC 100. Use of such delay techniques may allow for synchronizing test transactions sent by hardware transaction generator circuits 105*a* and 105*b* to each other or to other hardware transaction generator circuits included in SOC 100. In addition, the described delay techniques may be used to synchronize the sending of test transactions with generation and sending of non-test transactions by other agents in SoC 100, including, e.g., local functional circuits 115 or 125.

As shown, test transactions may be generated and sent concurrently with non-test transactions generated and sent by functional circuits operating in a normal functional mode. If a test transaction comes into conflict with a non-test transaction, e.g., both a waiting in a queue to be sent via one of independent networks 135, then the transaction with a higher QoS will have priority. If both have the same QoS, the non-test transaction will be prioritized over the test transaction. This may mitigate issues caused by high traffic from a test transaction with a large amount of data or multiple test transactions being sent in rapid succession.

Use of hardware transaction generator circuits 105 may provide a plurality of test capabilities for evaluation interface circuits 101, as well as other circuits included in SOC 100 in a manner that may not otherwise be possible. For example, local functional circuits 115 and 125 may not have a capability to generate sufficient sizes and/or types of transactions to exercise interface circuits 101 in a desired manner. By including hardware transaction generator circuits 105, such limitations may be overcome and a highly configurable set of test transactions may be generated to perform evaluations as desired. Additionally, use of hardware transaction generator circuits 105 may support scalability of testing by using hardware transaction generator circuits 105 to replace a local functional circuit 115 or 125, or devices coupled to SOC 100 by simulating request and response patterns that the replaced circuits would make without the need to add test capabilities to these circuits and devices.

It is noted that the SOC of FIG. 1 is merely an example for demonstrating the disclosed concepts. In other embodiments, different combinations of elements may be included in the SOC. For example, any suitable number of I/O cluster may be included, with each cluster including any suitable number of functional circuits. Although the global communication fabric is shown with three independent networks, any suitable number of independent networks may be included, in other embodiments. In some embodiments, the illustrated elements may be arranged in a different manner. For example, hardware transaction generator circuits 105 may be included in the respective I/O cluster separate from the corresponding interface circuit 101 rather than included within the corresponding interface circuit 101.

The SOC of FIG. 1 is described as including several networks that may support various communication and coherency protocols. Various network topologies, with associated protocols are contemplated, for example, U.S. Provisional Patent Application Ser. No. 63/176,075 which is hereby incorporated by reference in its entirely. (In the event of any inconsistency between this document and any material incorporated by reference, it is intended that this document control.) Three such network topologies that may be utilized in a global communication fabric are disclosed in FIGS. 2-4.

Figure 2:
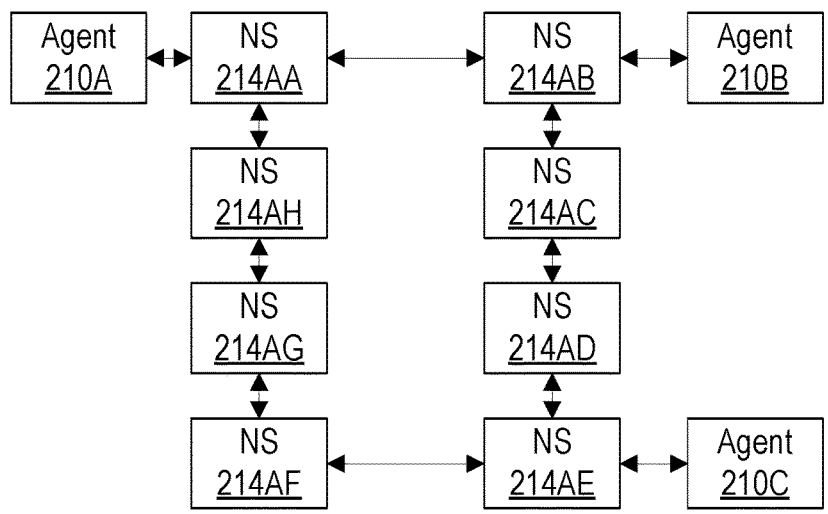
FIG. 2 shows a block diagram of one embodiment of a network using a ring topology.

Moving to FIG. 2, a block diagram of one embodiment of a network 200 using a ring topology to couple a plurality of agents is shown. In the example of FIG. 2, the ring is formed from network switches 214AA-214AH. Agent 210A is coupled to network switch 214AA; agent 210B is coupled to network switch 214AB; and agent 210C is coupled to network switch 214AE.

As shown, a network switch is a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

In a ring topology, each network switch 214AA-214AH may be connected to two other network switches 214AA-214AH, and the switches form a ring such that any network switch 214AA-214AH may reach any other network switch in the ring by transmitting a communication on the ring in the direction of the other network switch. A given communication may pass through one or more intermediate network switches in the ring to reach the targeted network switch. When a given network switch 214AA-214AH receives a communication from an adjacent network switch 214AA-214AH on the ring, the given network switch may examine the communication to determine if an agent 210A-210C to which the given network switch is coupled is the destination of the communication. If so, the given network switch may terminate the communication and forward the communication to the agent. If not, the given network switch may forward the communication to the next network switch on the ring (e.g., the other network switch 214AA-214AH that is adjacent to the given network switch and is not the adjacent network switch from which the given network switch received the communication). As used herein, an "adjacent network switch" to a given network switch may be a network switch to which the given network switch may directly transmit a communication, without the communication traveling through any intermediate network switches.

Figure 3:
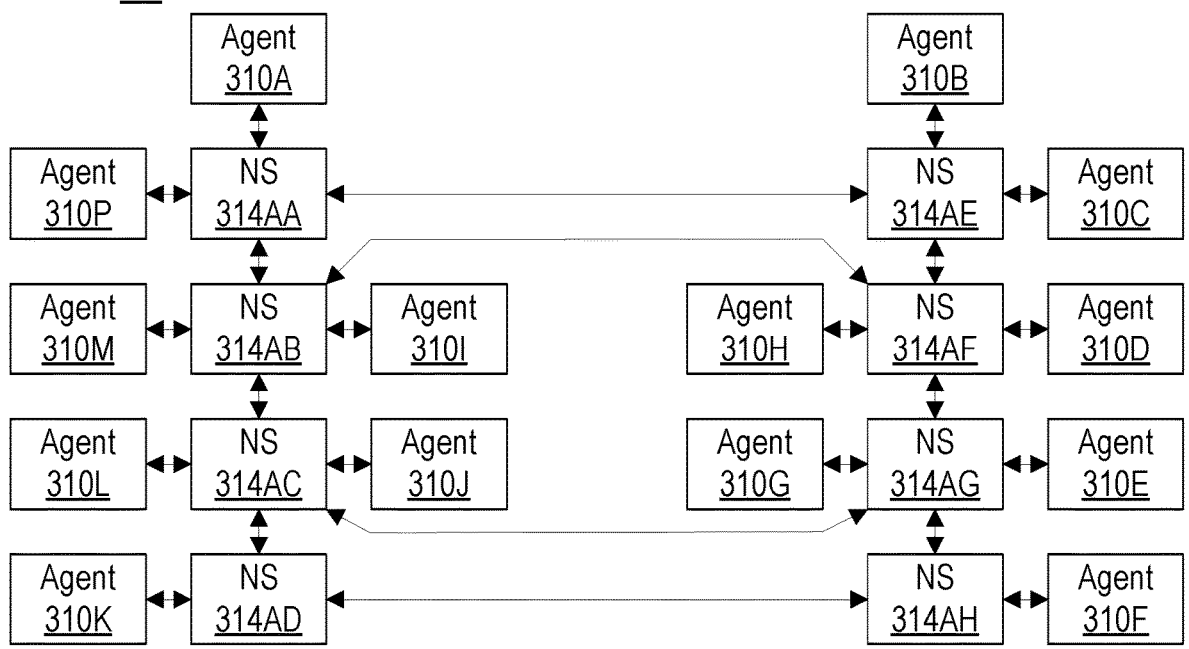
FIG. 3 depicts a block diagram of one embodiment of a network using a mesh topology.

Turning to FIG. 3, a block diagram of one embodiment of a network 300 using a mesh topology to couple agents 310A-310P is illustrated. As shown in FIG. 3, network 300 may include network switches 314AA-314AH. Network switches 314AA-314AH are coupled to two or more other network switches. For example, network switch 314AA is coupled to network switches 314AB and 314AE; network switch 314AB is coupled to network switches 314AA, 314AF, and 314AC; etc. as illustrated in FIG. 3. Thus, individual network switches in a mesh network may be coupled to a different number of other network switches. Furthermore, while network 300 has a relatively symmetrical structure, other mesh networks may be asymmetrical, for example, depending on the various traffic patterns that are expected to be prevalent on the network. At each network switch 314AA-314AH, one or more attributes of a received communication may be used to determine the adjacent network switch 314AA-314AH to which the receiving network switch 314AA-314AH will transmit the communication (unless an agent 310A-310P to which the receiving network switch 314AA-314AH is coupled is the destination of the communication, in which case the receiving network switch 314AA-314AH may terminate the communication on network 300 and provide it to the destination agent 310A-310P). For example, in an embodiment, network switches 314AA-314AH may be programmed at system initialization to route communications based on various attributes.

In an embodiment, communications may be routed based on the destination agent. The routings may be configured to transport the communications through the fewest number of network switches (the "shortest path) between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example. Additionally, a path may change between two particular network switches for different communications at different times. For example, one or more intermediate network switches in a first path used to transmit a first communication may experience heavy traffic volume when a second communication is sent at a later time. To avoid delays that may result from the heavy traffic, the second communication may be routed via a second path that avoids the heavy traffic.

FIG. 3 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

Figure 4:
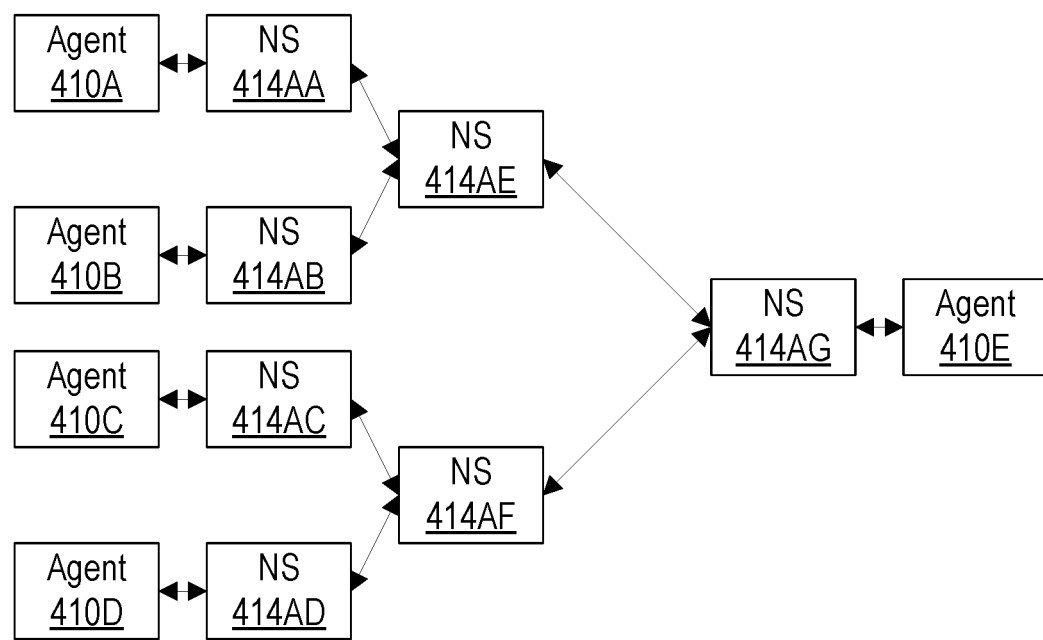
FIG. 4 illustrates a block diagram of one embodiment of a network using a tree topology.

Proceeding to FIG. 4, a block diagram of one embodiment of a network 400 using a tree topology to couple agents 410A-410E is shown. The network switches 414AA-414AG are interconnected to form the tree in this example. The tree is a form of hierarchical network in which there are edge network switches (e.g., 414AA, 414AB, 414AC, 414AD, and 414AG in FIG. 4) that couple, respectively, to agents 410A-410E and intermediate network switches (e.g., 414AE and 414AF in FIG. 4) that couple only to other network switches. A tree network may be used, e.g., when a particular agent is often a destination and/or a source for communications issued by other agents. Thus, for example, network 400 may be used for agent 410E being a principal source and/or destination for communications to/from agents 410A-410D. For example, the agent 410E may be a memory controller which would frequently be a destination for memory transactions.

There are many other possible topologies that may be used in other embodiments. For example, a star topology has a source/destination agent in the "center" of a network and other agents may couple to the center agent directly or through a series of network switches. Like a tree topology, a star topology may be used in a case where the center agent is frequently a source or destination of communications. A shared bus topology may be used, and hybrids of two or more of any of the topologies may be used.

FIGS. 2-4 illustrate a variety of network topologies that may be used in a given SOC. In some embodiments, an SOC may include more than one type of network topology in a single SOC. Referring back to FIG. 1 for example, independent network 135a may have a ring topology, independent network 135b may have a mesh topology, and independent network 135c may have a tree topology. Any suitable combination of topologies are contemplated for other embodiments. Another SOC with multiple types of network topologies is shown in FIG. 5.

Figure 5:
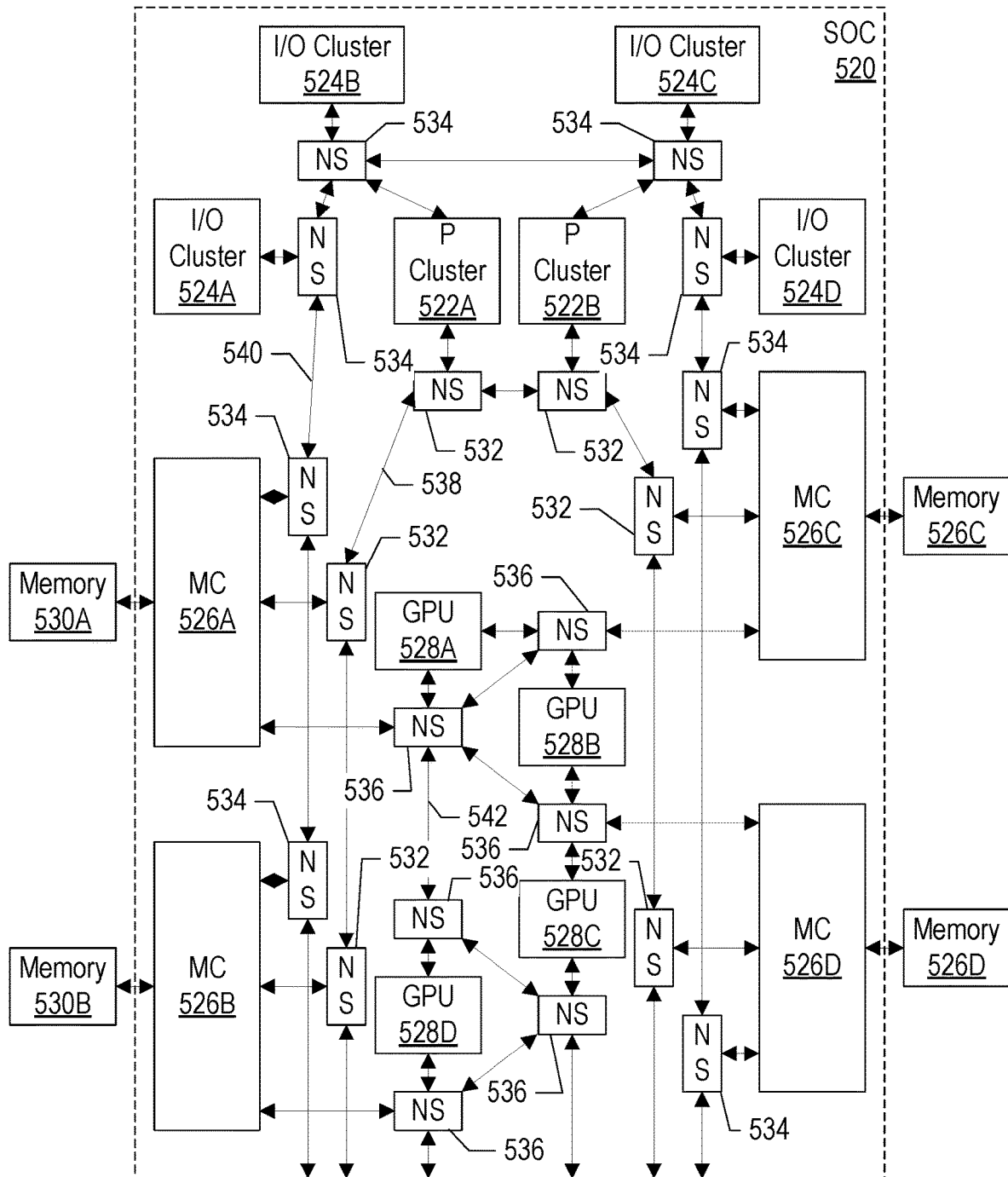
FIG. 5 shows a block diagram of one embodiment of a system on a chip (SOC) having multiple networks for one embodiment.

Moving now to FIG. 5, a block diagram of one embodiment of a system on a chip (SOC) 520 having multiple networks with different topologies is illustrated. In the embodiment of FIG. 5, the SOC 520 includes a plurality of processor clusters (P clusters) 522A-522B, a plurality of input/output (I/O) clusters 524A-524D, a plurality of memory controllers 526A-526D, and a plurality of graphics processing units (GPUs) 528A-528D. The memories 530A-530D are coupled to the SOC 520, and more specifically to the memory controllers 526A-526D respectively as shown in FIG. 5. As implied by the name (SOC), the components illustrated in FIG. 5 (except for the memories 530A-530D in this embodiment) may be integrated onto a single semiconductor die or "chip." However, other embodiments may employ two or more die coupled or packaged in any desired fashion.

In the illustrated embodiment, the SOC 520 includes three physically and logically independent networks formed from a plurality of network switches 532, 534, and 536 as shown in FIG. 5 and interconnect therebetween, illustrated as arrows between the network switches and other components. Collectively, these independent networks form a global communication fabric, enabling transactions to be exchanged across SOC 520. Other embodiments may include more or fewer networks. The network switches 532, 534, and 536 may be instances of network switches similar to the network switches 14A-14B as described above with regard to FIGS. 2-4, for example. The plurality of network switches 532, 534, and 536 are coupled to the plurality of P clusters 522A-522B, the plurality of GPUs 528A-528D, the plurality of memory controllers 526A-25B, and the plurality of I/O clusters 524A-524D as shown in FIG. 5. The P clusters 522A-522B, the GPUs 528A-528B, the memory controllers 526A-526B, and the I/O clusters 524A-524D may all be examples of agents that communicate on the various networks of the SOC 520. Other agents may be included as desired.

In FIG. 5, a central processing unit (CPU) network is formed from a first subset of the plurality of network switches (e.g., network switches 532) and interconnect therebetween such as reference numeral 538. The CPU network couples the P clusters 522A-522B and the memory controllers 526A-526D. An I/O network is formed from a second subset of the plurality of network switches (e.g., network switches 534) and interconnect therebetween such as reference numeral 540. The I/O network couples the P clusters 522A-522B, the I/O clusters 524A-524D, and the memory controllers 526A-526B. A relaxed order network is formed from a third subset of the plurality of network switches (e.g., network switches 536) and interconnect therebetween such as reference numeral 542. The relaxed order network couples the GPUs 528A-528D and the memory controllers 526A-526D. In an embodiment, the relaxed order network may also couple selected ones of the I/O clusters 524A-524D as well.

As mentioned above, the CPU network, the I/O network, and the relaxed order network are independent of each other (e.g., logically and physically independent). In an embodiment, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches 532, 534, and 536 may have and form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

In some embodiments, ones of I/O clusters 524A-524D may correspond to I/O cluster 110 and/or 120 in FIG. 1. It is noted that the complexity of the multiple independent networks of SOC 520 may hinder or prevent direct access to interface circuits 101 of FIG. 1. Accordingly, to perform an evaluation of the interface circuits 101, test stimulus generated outside of SOC 520 would be passed to via a functional circuit that is included in a corresponding I/O cluster as well as coupled to external pins of SOC 520. Such functional circuits, however, may have limits on throughput and/or protocols for sending the desired stimulus to an interface circuit 101 being evaluated. For example, an attempt to send stimulus through a USB port included in I/O cluster 524A to test an interface circuit included therein may be limited by a bitrate for the USB port as well as by use of data packets that conform to USB protocols. While this may provide some level of testing capabilities, an evaluator may not be able to perform boundary tests and/or to exercise the interface circuit beyond its design limits to determine a physical limitation of the circuit. By including a programmable hardware transaction generator circuit with a corresponding instance of an interface circuit. Test stimulus may be generated that is not capable of being sent via the functional circuits of a given I/O cluster, or it may be used to increase the probability of how often a condition occurs verses how often the condition occurs under normal operating conditions. This transaction generation capability may be used for test stimulus for both validation as well as debug scenarios. For example, if an evaluator knows a particular transaction traffic pattern that causes a specific condition during execution of a particular test or production program, then the hardware transaction generator may be used to reproduce the specific condition with increased frequency to recreate an original failure.

In an embodiment, the SOC 520 may be designed to couple directly to one or more other instances of the SOC 520, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 5, the networks extend to the bottom of the SOC 520 as oriented in FIG. 5. Interface circuitry (e.g., serializer/deserializer (SERDES) circuits), not shown in FIG. 5, may be used to communicate across the die boundary to another die. In other embodiments, the networks may be closed networks that communicate only intra-die.

As mentioned above, different networks may have different topologies. In the embodiment of FIG. 5, for example, the CPU and I/O networks implement a ring topology, and the relaxed order may implement a mesh topology. However, other topologies may be used in other embodiments.

It is noted that the SOC of FIG. 5 is merely an example. Elements for illustrated the disclosed concepts are shown while other elements typical of an SOC have been omitted for clarity. For example, while specific numbers of P clusters 522A-522B, I/O clusters 524A-524D, memory controllers 526A-526D, and GPUs 528A-528D are shown in the example of FIG. 5, the number and arrangement of any of the above components may be varied and may be more or less than the number shown in FIG. 5.

In the descriptions of I/O clusters in FIG. 1, reference is made to formats for transactions sent via a local fabric and via the independent networks of the global communication fabric. Formats for data packets used on a given type of bus or network may be implemented in a variety of fashions. An example for an independent network format and a for a local fabric are shown in FIG. 6.

Turning now to FIG. 6, two tables depicting packet formats for transactions in an SOC are illustrated. Independent network packet format 680 is an example of a packet format that may be used for transactions sent via one or more of independent networks 135 of FIG. 1. In a similar manner, local fabric packet format 685 is an example of a format that may be used for transactions sent via one or both of local fabrics 140. A given transaction between two or more agents may include a signal packet or a plurality of packets sent in succession. For example, a transaction from a first agent to a second agent to read a particular data file may include an initial packet sent from the first agent to the second agent, wherein the initial packet includes the request for the data file. The second agent, after receiving the read request, may respond with a series of packets, each packet including a payload that contains a portion of the requested data file. The initial packet, in combination with the series of packets of the response may be considered a single transaction.

As shown, each of the depicted packets includes three pieces of information: a header, an address, and a payload. The header may include information about the packet including an identifier that associates the packet to a particular transaction, a QoS indicator, a network indicator, a type of packet, an indication of a size of the included payload, and the like. The address, in various embodiments, may be a physical address of a memory mapped location in SOC 100, or may be a logical address that is translated to a physical address by an interface circuit 101 or other circuit in SOC 100. The payload may include any suitable type of information being sent from a first agent to a second agent, such as a command to store data included in the payload, or a request for particular file from the second agent. File contents sent by the second agent are included in one or more payloads included in packets sent by the second agent.

Independent network packet format 680, as illustrated, includes twelve bits in the header, eight bytes in the address, and 4-256 bytes in the payload. In contrast, local fabric packet format 685 includes eight bits in the header, four bytes in the address, and 1-32 bytes in the payload. In the illustrated example, local fabric packet format 685 supports less data per packet than independent network packet format 680. A "packet," as used herein, refers to a smallest portion of a transaction that may be exchanged between two agents as a single unit. If a packet is not sent successfully, then transmission of the entire packet may be repeated until it is completed successfully. A successful transaction may include repeated transmissions of individual packets without retransmitting an entire transaction.

In some embodiments, a size of a packet format may correspond to a size of the corresponding local fabric or independent network. For example, a packet format may be limited to a total number of bits that may be sent via the corresponding bus in parallel. If local fabric 140*a* includes 128 wires for transmitting packets, then the corresponding local fabric packet format 685 may be limited to the header (1 byte), the address (4 bytes), and a payload of 11 bytes, for a total of 128 signals that can be sent across the 128 wires in parallel. In other embodiments, the same packet format may be used with a bus that has 64 wires, wherein the 128 signals are sent 64 bits at a time in two successive bus cycles. The illustrated formats 680 and 685 are merely examples. Any suitable formats may be implemented in various embodiments.

In addition to packet limits, a given transaction may be limited to a maximum amount of data. As previously disclosed, each one of local functional circuits 115 may perform a different function. Protocols associated with each function may limit a size of a single transaction. For example, a USB circuit may include a buffer for temporarily storing data to be sent via a USB connection. A single transaction to send data to the USB circuit may be limited to an amount of data corresponding to the size of the buffer. A buffer size of 1024 bytes, therefore, may limit a size of a transaction to the USB circuit to 1024 bytes to allow the buffer to hold a complete transaction's worth of data, or to 512 bytes to allow the buffer to hold two transactions worth of data. Local fabric 140*a*, therefore, may be limited to supporting a maximum amount of data per transaction corresponding to a maximum amount supported by one of local functional circuits 115. Independent networks 135 may include similar maximums as determined by amounts of data supported by agents coupled to the networks. An example usage of hardware transaction generator circuit 105 includes causing a maximum number of outstanding transactions to be queued. The network topology and its connections may then be tested to verify that they support a total number of transactions that functional circuits such as connected I/O circuits and displays can generate, transferring the transactions through to the functional fabrics, as well as receiving expected response transactions.

To generate set of test transactions 175 as described above, hardware transaction generator circuit 105*a* is configured to include, in one or more test transactions of set of test transactions 175, a first maximum amount of data allowed by a particular independent network (e.g., independent network 135*b*). This first maximum amount of data allowed by independent network 135*b* may be greater than a second maximum amount of data allowed by local fabric 140*a*. For example, hardware transaction generator circuit 105*a* may be configured to mimic a transaction from local functional circuit 115*c* to local functional circuit 125*b*. Local functional circuit 115*c* may be configured to generate a given transaction including the second maximum amount of data. To generate a given test transaction, the hardware transaction generator circuit 105*a* may be configured to generate the given test transaction including an amount of data that is greater than the first maximum amount, such as the first maximum amount of data allowed by independent network 135*b*. Accordingly, use of hardware transaction generator circuit 105*a* allows interface circuit 101*a* to be tested using an amount of data that cannot be produced by any given one of local functional circuits 115.

It is noted that the examples of FIG. 6 are simplified for clarity. In other embodiments, one or both packet formats may include additional information. The illustrated sizes for each element of the packets are merely an example. In other embodiments, the packet formats may utilize any suitable sizes.

FIG. 6 depicts different packet formats associated with transactions. Proceeding now to FIG. 7, a pair of tables 780 and 782 illustrating virtual channels and traffic types and the associated networks on which they are used are illustrated. As shown in table 780, the virtual channels may include the bulk virtual channel, the low-latency (LLT) virtual channel, the real-time (RT virtual channel) and the virtual channel for non-DRAM messages (VCP). The bulk virtual channel may be the default virtual channel for memory accesses. The bulk virtual channel may receive a lower QoS than the LLT and RT virtual channels, for example. The LLT virtual channel may be used for memory transactions for which low latency is needed for high performance operation. The RT virtual channel may be used for memory transactions that have latency and/or bandwidth requirements for correct operation (e.g., video streams). The VCP channel may be used to separate traffic that is not directed to memory, to prevent interference with memory transactions.

In an embodiment, the bulk and LLT virtual channels may be supported on all three networks (CPU, I/O, and relaxed order). The RT virtual channel may be supported on the I/O network but not the CPU or relaxed order networks. Similarly, the VCP virtual channel may be supported on the I/O network but not the CPU or relaxed order networks. In an embodiment, the VCP virtual channel may be supported on the CPU and relaxed order network only for transactions targeting the network switches on that network (e.g., for configuration) and thus may not be used during normal operation. Thus, as table 780 illustrates, different networks may support different numbers of virtual channels.

Table 782 illustrates various traffic types and which networks carry that traffic type. The traffic types may include coherent memory traffic, non-coherent memory traffic, real-time (RT) memory traffic, and VCP (non-memory) traffic. The CPU and I/O networks may be both carry coherent traffic. In an embodiment, coherent memory traffic sourced by the processor clusters 522A-522B of FIG. 5 may be carried on the CPU network, while the I/O network may carry coherent memory traffic sourced by the I/O clusters 524A-524D. Non-coherent memory traffic may be carried on the relaxed order network, and the RT and VCP traffic may be carried on the I/O network.

Hardware transaction generator circuit 105*a* is configured to generate test transactions that test an ability of interface circuit 101*a* to properly handle the various formats, coherency requirements, and qualities of service that may be encountered during an operational lifetime of SOC 100. For example, to simulate the interactions between one or more of a particular set of local functional circuits 115 and a network such as independent network 135*b*, interface circuit 101*a* is further configured to receive, at an input from local fabric 140*a*, set of test transactions 175 in a first format supported by local fabric 140*a*. Interface circuit 101*a* is also configured to translate set of test transactions 175 from the first format to a second format supported by independent network 135*b*. In some embodiments, this translation may include changing the coherency of set of test transactions 175. For example, local fabric 140*a* may be non-coherent while at least one of the multiple independent networks 135 is configured to enforce coherency.

Additionally, interface circuit 101*a* may send a particular test transaction of set of test transactions 175 to a particular one of independent networks 135 via a particular one of the plurality of virtual channels. Set of test transactions may be configured to mimic any traffic type supported by interface circuit 101*a*, including, e.g., bulk, LLT, RT, and VCP types as described above. Hardware transaction generator circuit 105*a*, may for example, be configured to generate a first test transaction of set of test transactions 175 as a bulk type with a large amount of data that will utilize a plurality of packets to complete. While interface circuit 101*a* is processing this bulk test transaction, hardware transaction generator circuit 105*a* may be further configured to generate a second test transaction of the set as an LLT type with a higher QoS than the bulk test transaction. Such a combination may evaluate a capability of interface circuit 101*a* to successfully route the bulk test transaction on a corresponding bulk virtual channel while also routing the second LLT transaction via a corresponding LLT virtual channel, thereby allowing the second LLT test transaction to complete before the first bulk test transaction.

It is noted that the tables of FIG. 7 are merely examples. Although four types of virtual channels are shown, any suitable number may be utilized in a particular embodiment. In addition, coherent transactions may be further broken down by transactions that utilize different types of coherency schemes.

FIGS. 6 and 7 depict various packet formats and transaction types that are associated with transactions that are handled by an interface circuit. Hardware transaction generator circuit 105 is described as having a capability to mimic various combinations of types and formats to generate test transactions. Support for these variations may be implemented using a variety of techniques. One such implementation is illustrated in FIG. 8.

Figure 8:
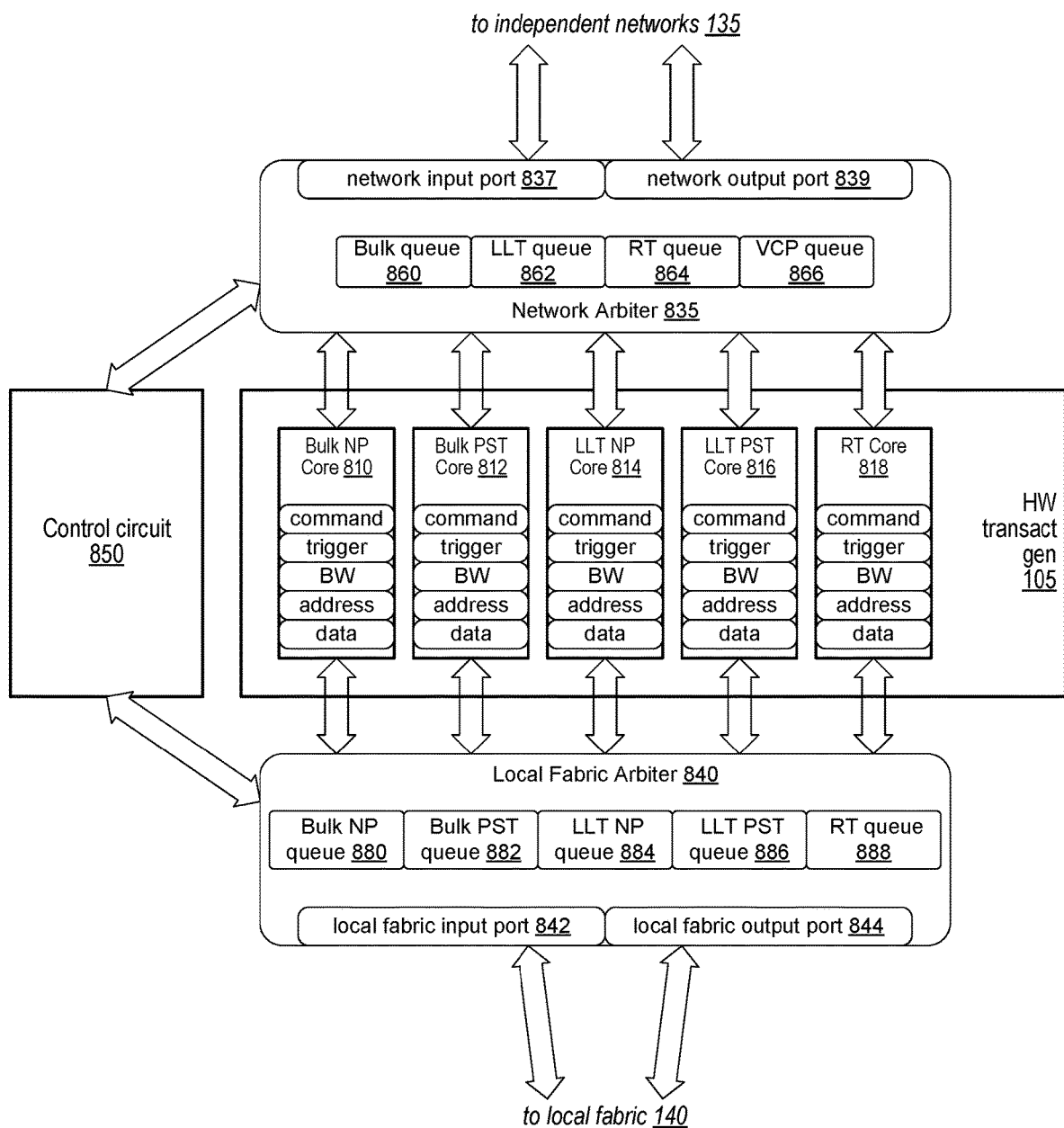
FIG. 8 depicts a block diagram of an embodiment of an interface circuit that includes a hardware transaction generator.

Moving to FIG. 8, a block diagram of an embodiment of an interface circuit is illustrated. Interface circuit 101 includes hardware transaction generator circuit (HW transact gen) 105, local fabric arbiter 840, network arbiter 835, and control circuit 850. Network arbiter 835 includes network input port 837 and network output port 839, as well as four virtual channel queues: bulk queue 860, low-latency (LLT) queue 862, real-time (RT) queue 864, and virtual channel for non-DRAM messages (VCP) queue 866. Similarly, local fabric arbiter 840 includes local fabric input port 842 and local fabric output port 844, as well as five virtual channel queues: bulk non-posted (NP) queue 880, bulk posted (PST) queue 882, LLT non-posted (NP) queue 884, LLT posted (PST) queue 886, and RT queue 888. Hardware transaction generator circuit 105 includes five cores for generating particular types of test transactions: bulk NP core 810, bulk PST core 812, LLT NP core 814, LLT PST core 816, and RT core 818.

As illustrated, interface circuit 101 is coupled to local fabric 140 via local fabric arbiter 840, and to one or more of independent networks 135 of global communication fabric 130 via network arbiter 835. During normal operation, interface circuit 101 receives a transaction via network input port 837 or local fabric input port 842, determines a destination for the transaction, and sends the transaction to the determined destination via local fabric output port 844 or network output port 839, respectively. For example, if interface circuit 101 corresponds to interface circuit 101a in FIG. 1, then local functional circuit 115b may be the source for a particular transaction. Interface circuit 101 is configured to receive the particular transaction from local functional circuit 115b via local fabric input port 842. Control circuit 850 determines a destination for the particular transaction, performs any translation of the transaction, if needed.

Interface circuit 101 is further configured to send the particular transaction to a particular one of independent networks 135 via a particular one of the plurality of virtual channels by using one of the virtual channel queues 860-866. Based on information associated with the particular transaction, such as may be included in a header and/or payload portion of a first packet of the particular transaction, the translated transaction is placed into a corresponding one of virtual channel queues 860-866, corresponding with a QoS associated with the translated transaction.

As illustrated, network arbiter 835 supports four types of virtual channels, corresponding to bulk, LLT, RT, and VCP channels. Each of these channels is implemented using the respective virtual channel queues 860-866. Although four types of virtual channels are shown, any suitable number may be included in various embodiments. As described above, the various virtual channels may share a common physical interface (e.g., network input port 837 and network output port 839) for sending and receiving transactions. By queuing the respective types of transactions, interface circuit 101 may implement respective QoS conditions for each type of transaction while utilizing the common interface. Individual ones of the plurality of virtual channels support a respective communication and coherency protocol, such as described in regards to FIG. 7. Logic circuits in network arbiter 835 may forward transactions in the plurality of virtual channel queues 860-866 using the QoS standards for each type of transaction. For example, a given transaction in bulk queue 860 may be selected for transmission when no other transactions are waiting in the other three queues. If the given transaction includes a plurality of packets to be sent, and a higher QoS transaction is placed into one of the other three queues (e.g., RT queue 864), then the given bulk transaction may be paused after a current packet is sent and the RT transaction may then be selected for sending via network output port 839. The in progress bulk transaction may then be resumed once the RT transaction has completed.

In a similar manner, local fabric arbiter 840 supports five types of virtual channels. The five channels are bulk NP, bulk PST, LLT NP, LLT PST, and RT channels, each implemented with a respective one of virtual channel queues 880-888. Logic circuits in local fabric arbiter 840 may select a transaction for processing from the five virtual channel queues 880-888 based on suitable selection criteria, such as selecting transactions with a highest QoS, transaction that have been waiting the longest, or a combination thereof.

It is noted that local fabric 140 supports different QoS transactions than the independent networks 135. Both bulk and LLT transactions are split into posted (PST) and non-posted (NP) sub-categories. A "non-posted" transaction, as used herein, refers to a transaction that is not completed until a response is received back from the destination agent. NP transactions must be tracked until the response is received. For a transaction with a read request, the requested data may be considered the response. For a transaction with a write request, the response may be a confirmation from the destination agent that the write was completed successfully. A "posted" transaction, as used herein, refers to a transaction that is marked as completed once all packets associated with the transaction have been sent from a source agent via the local fabric. If a posted transaction is a read request with a single packet, then the read transaction is considered processed once the read packet is sent. If a posted transaction is a write request with a plurality of packets, then the write transaction is considered processed once the final packet is sent. Some functional circuits and/or virtual channels may place particular expectations on PST or NP transactions which may lead to particular error conditions if the expectations are not satisfied. Accordingly, hardware transaction generator circuit 105 may be used for testing specific transaction and response error conditions, along with the hardware handling of these errors, by intentionally causing a failure to meet one or more of the particular expectations.

As disclosed above, interface circuit 101 may be implemented in such a manner in SOC 100 that accessing local fabric input port 842 or network input port 837 in order to provide test stimulus to interface circuit 101 for evaluation, may be difficult or impossible without physically altering SOC 100. Accordingly, programmable hardware transaction generator circuit 105 is coupled to interface circuit 101 and is configured to generate a test transaction that mimics a transaction associated with a selected one of a plurality of functional circuits coupled to local fabric 140 (e.g., local functional circuits 115 or 125). Interface circuit 101 is also configured to send the generated test transaction to a given one of independent networks 135 via a selected one of the plurality of virtual channels.

To support generating test transactions for the different virtual channels, hardware transaction generator circuit 105 includes five transaction generator cores: bulk NP core 810, bulk PST core 812, LLT NP core 814, LLT PST core 816, and RT core 818. Each core is configured to generate a set of test transactions conforming to the respective type of transaction. For example, bulk NP core 810 generates non-posted test transactions that have a bulk QoS requirement, while LLT PST core 816 generates posted test transactions with a low-latency QoS requirement. Each core includes a set of registers that may be programmed by an evaluator to establish a particular set of test transactions based on particular features or characteristics of interface circuit 101 that the evaluator desires to test. These registers may be programmed via a processor or debugging circuit in SOC 100. For example, a processor in P cluster 522A of FIG. 5 may execute evaluation code that includes instructions to set the registers to desired values. Additionally, an evaluator using debug software running on a computer system may access a debugging circuit in SOC 100, and then use the debugging circuit to set the registers to suitable values for generating a desired set of test transactions.

Hardware transaction generator circuit 105, as illustrated, includes one transaction generator core for each corresponding type of virtual channel supported by local fabric arbiter 840. In other embodiments, this number may differ from the virtual channels of a particular local fabric arbiter, including more or fewer. For example, a particular hardware transaction generator circuit may be coupled to a local fabric arbiter that supports fewer virtual channels than the particular interface circuit is capable of supporting. In such a case, the particular hardware transaction generator circuit may support additional virtual channel types to test capabilities of the particular interface circuit that could not otherwise be mimicked.

As shown, each core includes a respective set of registers that receive a command for the respective core, a trigger for initiating the test transaction generation, a bandwidth (BW) setting for establishing a particular rate for sending transactions, an address for a destination agent for the test transactions, and data to be used in the test transaction payloads. Accordingly, each of the five transaction generator cores may be programmed individually to generate respective types of test transactions to be sent to various destination agents with varying amounts of and values of data. The rate at which transactions are generated may be adjusted to test a response of interface circuit 101 to very slow and/or very rapid generation of transactions. Using the respective trigger registers, the cores may be programmed to initiate multiple transactions at a same time, in an overlapping manner, and/or sequentially, one immediately following another. In addition, the respective triggers may be programmed to trigger one or more of the transactions in response to an event or signal generated by another circuit in SoC 100, including for example, one of local functional circuits 115 and 125.

As an example of test transaction generation, a first one of transaction generator cores 810-818 (e.g., bulk NP core 810) may be programmed to generate a test transaction using a particular data pattern continuously for 100 cycles of a clock signal, and then cease the generation for 200 cycles before repeating. By repeating such a test, interface circuit 101 may be exercised at one-third of its maximum possible bandwidth. A second one of transaction generator cores 810-818 (e.g., bulk PST core 812) may be programmed to generate a test transaction using a different data pattern continuously for 50 cycles, and then also cease the generation for 200 cycles before repeating. Bulk PST core 812 may be further programmed to begin the 50 cycle data pattern a particular number of cycles after bulk NP core 810 completes the 100 cycle data pattern, such as 20 cycles after completion.

To evaluate the local fabric arbiter, transactions generated by each transaction generator core 810-818 may, in some embodiments, be sent to local fabric input port 842, thereby testing the input path to interface circuit 101 as well as all internal circuits for receiving, translating, and then sending each transaction. In other embodiments, each transaction generator core 810-818 may send generated transactions directly to a corresponding virtual channel queue 880-888. E.g., bulk NP core 810 sends transactions to bulk NP queue 880, bulk PST core 812 sends transactions to bulk PST queue 882, and so forth. In some embodiments, hardware transaction generator circuit 105 may verify that test transactions that have been received and translated within interface circuit 101 (e.g., by network arbiter 835) have been correctly translated to a suitable protocol for particular ones of independent networks 135 before the translated test transactions are sent. For example, a data pattern of a translated test transaction may be compared to the data indicated in the registers of the one transaction generator core 810-818 that originated the test transaction.

Hardware transaction generator circuit 105, as depicted, may be used to generate error conditions based on various combinations of transaction types, virtual channels, destination addresses, and the like. Such usage may allow an evaluator to confirm a particular error condition observed while preforming other tests or during normal operation of SOC 100 in an end-user system. Additionally, hardware transaction generator circuit 105 may be used to correlate results from other forms of testing, and to observe any changes in results due to use of different data patterns in test transactions. These changes may be observed down to an I/O cluster level, rather than being limited to the SOC level. For debugging SOC 100, hardware transaction generator circuit 105 may initiate programmed requests to support profiling of state information while an evaluator traces other transaction traffic. In addition, by programming hardware transaction generator circuit 105 to generate particular transactions to programmable circuits accessible via global communication fabric 130, hardware transaction generator circuit 105 may be used as a mechanism to provide a workaround solution for circuits that do not meet functional expectations or to provide new capabilities to particular circuits.

In addition to generating test transactions to be sent via network arbiter 835, hardware transaction generator circuit 105 may, in some embodiments, be configured to receive test transactions generated by a different instance of hardware test transaction generator circuit 105 and determine, based on the register settings, whether the received test transaction matches an expected pattern or has been corrupted during transmission. For example, hardware transaction generator circuit 105*a* in FIG. 1 may receive a test transaction that was generated by hardware transaction generator circuit 105*b*. One or more of the core registers may be programmed with a particular data pattern to expect. Any deviation from the expected pattern in a received test transaction results in hardware transaction generator circuit 105*a* providing an indication of the deviation, e.g., by asserting a particular test signal, by setting a particular value in a result register, or by taking other similar actions.

Use of hardware transaction generator circuit 105 may enable a level of evaluation of interface circuit 101 that would not otherwise be possible. An evaluator may test a new circuit design for a particular version of an interface circuit 101 to validate proper operation across desired operating conditions and may allow a determination of the operating limits of the interface circuit 101. Hardware transaction generator circuit 105 may also be used to validate that an existing interface circuit 101 design performs as expected when a change to a semiconductor manufacturing process is implemented, and/or a change to other circuits within SOC 100.

It is noted that the example of FIG. 8 is merely one embodiment of an interface circuit. Other embodiments may include additional elements such as clock circuits, latching circuits and the like. The number and types of virtual channels shown in FIG. 8 differ in various embodiments. Hardware transaction generator circuit 105 is described as generating test transactions that flow from the local fabric input port to the independent networks. In other embodiments, however, the direction of the flow may be reversed.

The circuits and techniques described above in regards to FIGS. 1-8 may be utilized to generate and send test transactions for transmission across an interface circuit. Two methods associated with generating test transactions are described below in regards to FIGS. 9 and 10.

Turning to FIG. 9, a flow diagram for an embodiment of a method for generating a test transaction is shown. Method 900 may be performed by a system that includes an interface circuit, such as systems disclosed herein, including SOC 100 in FIG. 1. Referring collectively to FIGS. 1 and 9, method 900 begins in block 910.

Method 900, at block 910, includes bridging, by interface circuit 101a included in SOC 100, transactions between a plurality of local functional circuits 115 coupled to local fabric 140 and global communication fabric 130 that includes multiple independent networks 135 having different communication and coherency protocols. As illustrated, transactions are bridged between local fabric 140a and ones of independent networks 135. To perform the bridging, interface circuit 101a receives a transaction from either local fabric 140a or one of independent networks 135. In some embodiments, interface circuit 101a is configured to translate received transactions between protocols of local fabric 140a and protocols of independent networks 135. For example, method 900 may include supporting, by a protocol of local fabric 140a, a relaxed order that does not enforce cache coherency; and enforcing, by a protocol of one or more of independent networks 135, cache coherency on transactions exchanged via the one or more independent networks.

At block 920, method 900 also includes generating, by interface circuit 110a, a test transaction that simulates a transaction from a particular one of local functional circuits 115 to a particular one of independent networks 135. The test transaction, as illustrated, is generated by hardware transaction generator circuit 105a. In an example, the test transaction simulates a transaction sourced by local functional circuit 115a and destined for an agent accessed via independent network 135b. The simulated transaction may, for example, mimic a write request from local functional circuit 115a to a memory circuit accessed via independent network 135b. Such a transaction may include sending a series of packets, including data to be written, via interface circuit 101a to independent network 135b. In some embodiments, such a write transaction may also include receiving a response from the memory circuit (or a memory controller coupled to the memory circuit) indicating that the data has been successfully written.

Method 900 further includes, at block 930, processing, by interface circuit 101a, the test transaction in a same manner as a non-test transaction from local functional circuit 115a. The test transaction may include a header, an address, a command or request, data, and any other relevant information that may be included in a particular type of transaction being simulated. As shown, hardware transaction generator circuit 105a may be used to test interface circuit 101a based on one or more use cases. Such use cases may include validating that interface circuit 101 is capable of receiving, processing, and transmitting an expected maximum number of transactions, including for example, meeting maximum throughput on each of a plurality of virtual channels.

Furthermore, processing the test transaction may include generating more data in the test transaction than local functional circuit 115a is capable of including in a single transaction. Processing the test transaction may also include generating more data in the test transaction than independent network 135b is capable of receiving in a single transaction. Hardware transaction generator circuit 105a may be capable of generating test transactions that exceed the limits of what interface circuit 101a, local fabric 140a, and/or independent networks 135 are designed to handle. By having the capability to exceed the limits of the circuits being tested, a full capability of these circuits may be observed and, if necessary or desired, changes may be implemented in a design revision to improve the capabilities if an evaluation determines a given circuit fails to meet expectations. In some cases, a design revision may be implemented to reduce capabilities of a given circuit to reduce power consumption and/or die size in response to determining that the capabilities exceed expectations.

In various embodiments, operations of method 900 may end in block 930 or may return to block 920 if additional test transactions are to be generated. It is noted that method 900 is one example for generating test transactions. Although interface circuit 101a and corresponding elements are used in this example, method 900 may be applied to interface circuit 101b and corresponding elements as well.

Proceeding to FIG. 10, a flow diagram for an embodiment of a method for generating multiple test transactions is illustrated. In a similar manner to method 900, method 1000 may be performed by a system that includes an interface circuit, such as systems disclosed herein, including SOC 100 in FIG. 1 or interface circuit 101 in FIG. 8. Referring collectively to FIGS. 8, and 10, method 1000 begins in block 1010.

Method 1000, at block 1010, includes generating, by interface circuit 101, a first test transaction of a first type of transaction of a plurality of types supported by interface circuit 101. As shown, interface circuit 101 supports a plurality of types that have different priorities. Independent networks 135 support a different set of types of transactions than local fabric 140. Accordingly, interface circuit 101 supports all types from both independent networks 135 and from local fabric 140, allowing interface circuit 101 to translate transactions between them. In the illustrated example, hardware transaction generator circuit 105 generates transactions that mimic transactions coming from local fabric 140. In other embodiments, hardware transaction generator circuit 105 may generate transaction that mimic transactions coming from one or more of independent networks 135. A particular one of transaction generator cores 810-818 is used to generate the first test transaction depending on what the first type is. For example, the first type may correspond to a bulk posted transaction, in which case bulk PST core 812 is used to generate the first test transaction for a particular one of independent networks 135.

As described above, if a priority of a test transaction needs to be arbitrated against a non-test transaction, the transaction with the higher QoS receives priority. If, however, both have a same QoS, then the non-test transaction receives priority over the test transaction.

At block 1020, method 1000 also includes selecting, by interface circuit 101, a first one of a plurality of virtual channels supported by the interface circuit based on the first type. Based on the first type of bulk posted, the first test transaction is placed in bulk PST queue 882 in local fabric arbiter 840 for control circuit 850 to retrieve and translate. Control circuit 850, as illustrated, selects a bulk virtual channel for the first test transaction and then converts the first test transaction into a bulk transaction. Control circuit 850 may perform a further translation from the local fabric format to the independent network format, if needed.

Method 1000 further includes, at block 1030, placing, by interface circuit 101, a memory request associated with the first test transaction in a queue for the first selected virtual channel. This memory request may be a read or a write request to any suitable address or range of addresses, including addresses corresponding to RAM, registers, and non-volatile memory. To send the translated first transaction to the particular independent network 135, control circuit 850 places a memory request corresponding to the translated first transaction in bulk queue 860 that is used for the selected bulk virtual channel. Depending on an amount of information that is associated with the first test transaction, one or more packets may be sent via the bulk virtual channel to a destination agent accessed via the particular independent network 135. The first test transaction is completed when all packets are sent and, since the first test transaction is a posted transaction, when a response to the memory request is received.

At block 1040, the method also includes generating, by interface circuit 101 while the first test transaction is being processed, a second test transaction of a second type with a different priority. For example, the second type may be a real-time transaction. RT core 818, therefore, is used to generate the second test transaction. It is noted that real-time transactions have a higher quality of service than bulk transactions such as the first test transaction.

Furthermore, method 1000 includes, at block 1050, selecting, by interface circuit 101, a second one of the plurality of virtual channels based on the second type. As illustrated, the real-time type of the second test transaction results in the second test transaction being received via RT queue 888 in local fabric arbiter 840. Control circuit 850 receives the second test transaction, performs, if needed, a translation from the local fabric format to the independent network format, and selects the real-time virtual channel for sending the second test transaction to the particular independent network 135.

At block 1060, the method also includes placing, by interface circuit 101a, a memory request associated with the second test transaction in a queue for the selected virtual channel. To send the translated second transaction to the particular independent network 135, control circuit 850 places a memory request corresponding to the translated second transaction in RT queue 864 that is used for the selected real-time virtual channel. Like the first test transaction, one or more packets may be sent via the real-time virtual channel to perform the second test transaction. Since the first test transaction is still active (e.g., a plurality of packets need to be sent), network arbiter 835 may suspend the first test transaction by selecting, after a current packet of the first test transaction completes processing, a packet of the second test transaction to send. Depending on a number of packets included in the second test transaction, all packets of the second test transaction may be sent before a next packet of the first test transaction is sent. In other cases, a next packet of the first test transaction may be sent before all packets of the second test transaction are sent based on an amount of time the next packet of the first test transaction has been suspended. Such operation of interface circuit 101 may be tested by proper programming of hardware transaction generator circuit 105 by an evaluator.

In various embodiments, method 1000 may end at block 1060 or may return to block 1010 to generate a subsequent test transaction. In some embodiments, method 1000 may repeat blocks 1040 through 1060 to generate multiple test transactions in an overlapping manner. These additional test transactions may be of any supported type, including the first and second types, as well as third, fourth, fifth types, etc.

It is noted that the method of FIG. 10 is merely an example for generating multiple test transactions. Method 1000 may be performed by any instances of the interface circuits disclosed in FIGS. 1-8. Variations of the disclosed methods are contemplated, including combinations of operations of methods 900 and 1000. For example, method 900 may be performed to generate one or more test transactions in series before two or more overlapping transactions are generated using method 1000.

Figure 11:
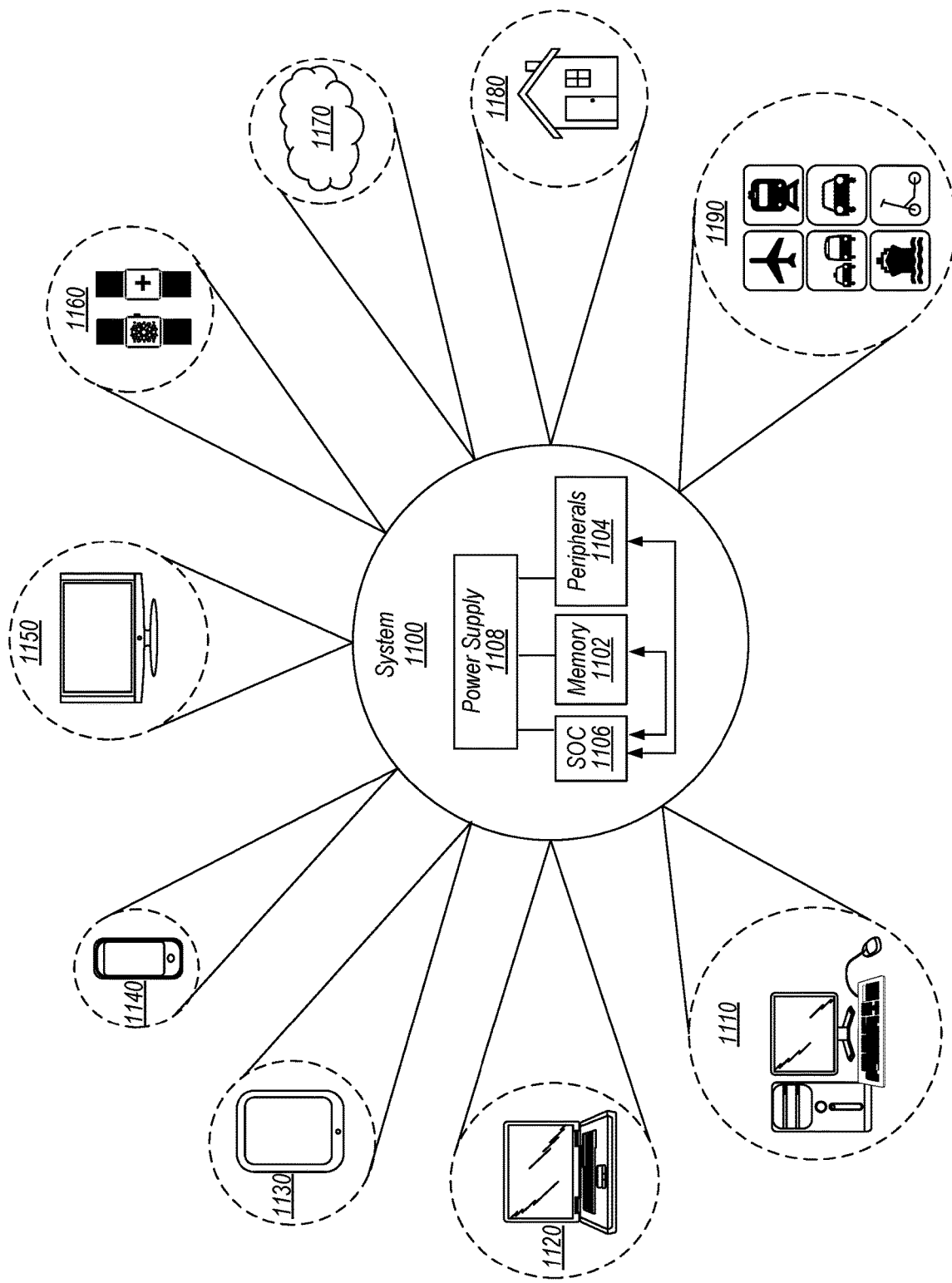
FIG. 11 illustrates various embodiments of systems that include coupled integrated circuits.

FIGS. 1-10 illustrate apparatus and methods for a system that includes generating test transactions for evaluating an interface circuit. Any embodiment of the disclosed systems may be included in one or more of a variety of computer systems, such as a desktop computer, laptop computer, smartphone, tablet, wearable device, and the like. In some embodiments, the circuits described above (e.g., SOCs 100 and 520) may be implemented on one or more integrated circuits. A block diagram illustrating an embodiment of computer system 1100 is illustrated in FIG. 11. Computer system 1100 may, in some embodiments, include any disclosed embodiment of SOC 100 and 520.

In the illustrated embodiment, the system 1100 includes at least one instance of SOC 1106 coupled to one or more peripherals 1104 and an external memory 1102. A power supply (PMU) 1108 is provided which supplies the supply voltages to the SOC 1106 as well as one or more supply voltages to the memory 1102 and/or the peripherals 1104. In some embodiments, more than one instance of the SOC 1106 may be included (and more than one memory 1102 may be included as well). The memory 1102 may include the memories 530A-530D illustrated in FIG. 5, in an embodiment.

The peripherals 1104 may include any desired circuitry, depending on the type of system 1100. For example, in one embodiment, the system 1100 may be a mobile device (e.g., personal digital assistant (PDA), smart phone, etc.) and the peripherals 1104 may include devices for various types of wireless communication, such as Wi-Fi, Bluetooth, cellular, global positioning system, etc. The peripherals 1104 may also include additional storage, including RAM storage, solid state storage, or disk storage. The peripherals 1104 may include user interface devices such as a display screen, including touch display screens or multitouch display screens, keyboard or other input devices, microphones, speakers, etc. In other embodiments, the system 1100 may be any type of computing system (e.g., desktop personal computer, laptop, workstation, net top etc.).

The external memory 1102 may include any type of memory. For example, the external memory 1102 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 1102 may include one or more memory modules to which the memory devices are mounted, such as single inline memory modules (SIMMs), dual inline memory modules (DIMMs), etc. Alternatively, the external memory 1102 may include one or more memory devices that are mounted on the SOC 1106 in a chip-on-chip or package-on-package implementation.

As illustrated, system 1100 is shown to have application in a wide range of areas. For example, system 1100 may be utilized as part of the chips, circuitry, components, etc., of a desktop computer 1110, laptop computer 1120, tablet computer 1130, cellular or mobile phone 1140, or television 1150 (or set-top box coupled to a television). Also illustrated is a smartwatch and health monitoring device 1160. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1100 may further be used as part of a cloud-based service(s) 1170. For example, the previously mentioned devices, and/or other devices, may access computing resources in the cloud (i.e., remotely located hardware and/or software resources). Still further, system 1100 may be utilized in one or more devices of a home 1180 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 1100 to various modes of transportation 1190. For example, system 1100 may be used in the control and/or entertainment systems of aircraft, trains, buses, cars for hire, private automobiles, waterborne vessels from private boats to cruise liners, scooters (for rent or owned), and so on. In various cases, system 1100 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

It is noted that the wide variety of potential applications for system 1100 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 11 are illustrative only and are not intended to be limiting. Other devices are possible and are contemplated.

As disclosed in regards to FIG. 11, computer system 1100 may include one or more integrated circuits included within a personal computer, smart phone, tablet computer, or other type of computing device. A process for designing and producing an integrated circuit using design information is presented below in FIG. 12.

Figure 12:
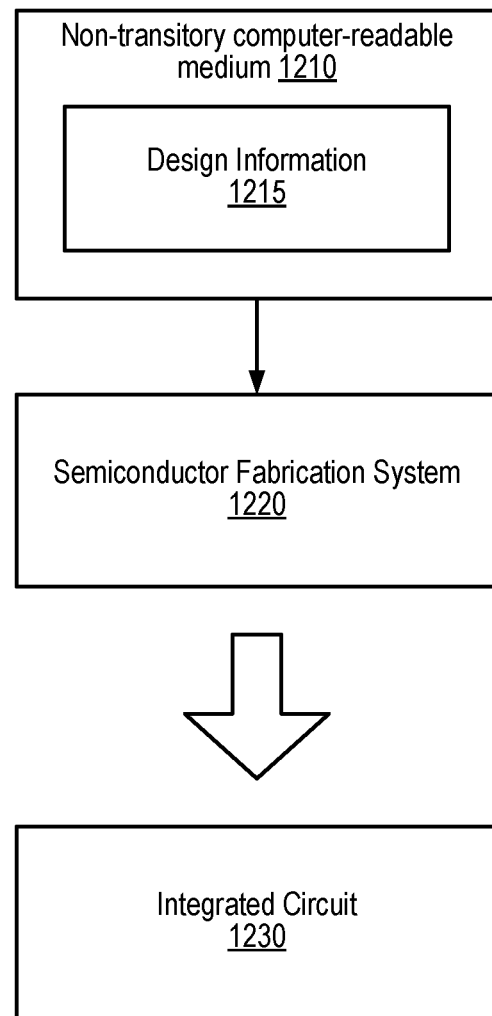
FIG. 12 shows a block diagram of an example computer-readable medium, according to some embodiments.

FIG. 12 is a block diagram illustrating an example of a non-transitory computer-readable storage medium that stores circuit design information, according to some embodiments. The embodiment of FIG. 12 may be utilized in a process to design and manufacture integrated circuits, such as, for example, SOCs 100 and 520 as shown in FIGS. 1 and 5. In the illustrated embodiment, semiconductor fabrication system 1220 is configured to process the design information 1215 stored on non-transitory computer-readable storage medium 1210 and fabricate integrated circuit 1230 (e.g., SOC 100) based on the design information 1215.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system, such as semiconductor fabrication system 1220, for example. In some embodiments, design information 1215 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of cells included in the cell library.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown or described herein. Further, integrated circuit 1230 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL)

such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A system, comprising:
 a first integrated circuit, included in a particular chip package, including:
  a first global communication fabric; and
  a first input-output (I/O) cluster including:
   a first set of local functional circuits; and
   a first interface circuit configured to bridge transactions between the first set of local functional circuits and the first global communication fabric; and
 a second integrated circuit, included in the particular chip package, including:
  a second global communication fabric coupled to the first global communication fabric;
  a second input-output (I/O) cluster including:
   a second set of local functional circuits; and
   a second interface circuit configured to bridge transactions between the second set of local functional circuits and the second global communication fabric; and
 wherein the first interface circuit is further configured to generate a set of test transactions that simulate interactions between the first set of local functional circuits and the second set of local functional circuits.

2. The system of claim 1, wherein the first and second global communication fabrics are configured to perform as a single global communication fabric across the first and second integrated circuits.

3. The system of claim 1, wherein the first and second global communication fabrics include respective sets of multiple independent networks having different communication and coherency protocols; and
 wherein at least one of the multiple independent networks in the first global communication fabric is coupled to a respective one of the multiple independent networks in the second global communication fabric.

4. The system of claim 1, wherein the first interface circuit is coupled to the first set of local functional circuits via a first local fabric; and
 wherein the second interface circuit is coupled to the second set of local functional circuits via a second local fabric.

5. The system of claim 4, wherein to simulate the interactions, the first interface circuit is further configured to:
 receive, at an input from the first local fabric, the set of test transactions in a first format supported by the first local fabric; and
 translate the set of test transactions from the first format to a second format supported by the first global communications fabric.

6. The system of claim 1, wherein to generate the set of test transactions, the first interface circuit is configured to include, in one or more test transactions of the set of test transactions, a first maximum amount of data allowed by the first global communications fabric.

7. The system of claim 6, wherein the first maximum amount of data allowed by the first global communications fabric is greater than a second maximum amount of data allowed by any of the first set of local functional circuits.

8. The system of claim 1, wherein individual ones of the first set of local functional circuits perform different functions, and wherein the first interface circuit is further configured to:
 generate a first test transaction of the set of test transactions that is compatible with a first function performed by a first local functional circuit of the first set of local functional circuits; and
 generate a second test transaction that is compatible with a second function performed by a second local functional circuit of the first set of local functional circuits.

9. The system of claim 1, wherein the first interface circuit is further configured to:
 generate a first test transaction of the set of test transactions that mimics a bulk type of transaction; and
 generate a second test transaction that that mimics a real-time type of transaction.

10. A method, comprising:
- bridging, by a first interface circuit included in a first integrated circuit included in a particular chip package, transactions between a first set of local functional circuits and a global communication fabric;
- generating, by the first interface circuit, a test transaction that simulates a transaction from a particular local functional circuit of the first set of local functional circuits to a different functional circuit of a second set of functional circuits included on a second integrated circuit included in the particular chip package;
- sending, by the first interface circuit, the test transaction via the global communication fabric; and
- receiving, by a second interface circuit included in the second integrated circuit, the test transaction from the global communication fabric.

11. The method of claim 10, further comprising delivering, by the second interface circuit, the test transaction to the different functional circuit.

12. The method of claim 10, wherein the generating includes generating, by the first interface circuit, the test transaction as a first type of transaction of a plurality of types supported by the first interface circuit, wherein ones of the plurality of types have different priorities.

13. The method of claim 12, wherein sending the test transaction includes:
- selecting, by the first interface circuit, one of a plurality of virtual channels supported by the first interface circuit based on the first type; and
- placing, by the first interface circuit, a memory request associated with the test transaction in a queue for the selected virtual channel.

14. The method of claim 10, wherein simulating the transaction from the particular local functional circuit includes:
- sending, by the first interface circuit using a first format supported by the particular local functional circuit, the test transaction to a local input port that is coupled to the particular local functional circuit;
- translating, by the first interface circuit, the test transaction from the first format to a second format supported by the global communication fabric; and
- sending the translated test transaction via the global communication fabric.

15. The method of claim 10, wherein generating the test transaction includes including more data in the test transaction than the global communication fabric is capable of transferring in a single transaction.

16. An apparatus, comprising:
- a particular integrated circuit that includes:
  - a particular global communication fabric;
  - a plurality of functional circuits configured to generate and receive transactions;
  - an interface circuit coupled to a subset of the plurality of functional circuits and to the particular global communication fabric, wherein the interface circuit is configured to:
    - generate a particular test transaction that mimics a transaction from a selected functional circuit of the subset of functional circuits to a different functional circuit that is excluded from the subset; and
    - send the particular test transaction to the different functional circuit via the particular global communication fabric.

17. The apparatus of claim 16, further comprising a different integrated circuit that includes:
- the different functional circuit; and
- a different global communication fabric, coupled to the particular global communication fabric such that the different and particular global communication fabrics operate as a single global communication fabric; and
- wherein the single global communication fabric is configured to transfer the particular test transaction from the interface circuit to the different functional circuit.

18. The apparatus of claim 16, wherein the interface circuit includes:
- a local port coupled to the subset of functional circuits; and
- a global port coupled to the particular global communication fabric; and
- wherein to send the particular test transaction, the interface circuit is further configured to:
  - send the particular test transaction to the local port using a first format supported by the selected functional circuit;
  - generate a translated version of the particular test transaction that has a format supported by the particular global communication fabric; and
  - send, via the global port, the translated version of the particular test transaction to the different functional circuit.

19. The apparatus of claim 16, wherein to send the particular test transaction to the different functional circuit, the interface circuit is further configured to select one of a plurality of virtual channels, individual ones of the virtual channels having different priority levels in the particular global communication fabric.

20. The apparatus of claim 16, wherein the interface circuit is further configured to generate a different test transaction in response to a programmed amount of time elapsing from the generation of the particular test transaction.

* * * * *